(12) United States Patent
Taya

(10) Patent No.: US 11,808,984 B2
(45) Date of Patent: Nov. 7, 2023

(54) OPTICAL FIBER FUSE PROTECTION DEVICE, LASER DEVICE, AND METHOD

(71) Applicant: FUJIKURA LTD., Tokyo (JP)

(72) Inventor: Hiroyuki Taya, Chiba (JP)

(73) Assignee: Fujikura Ltd., Tokyo (JP)

(*) Notice: Subject to any disclaimer, the term of this patent is extended or adjusted under 35 U.S.C. 154(b) by 17 days.

(21) Appl. No.: 17/621,389

(22) PCT Filed: Mar. 24, 2020

(86) PCT No.: PCT/JP2020/012915
§ 371 (c)(1),
(2) Date: Dec. 21, 2021

(87) PCT Pub. No.: WO2021/002068
PCT Pub. Date: Jan. 7, 2021

(65) Prior Publication Data
US 2022/0357511 A1 Nov. 10, 2022

(30) Foreign Application Priority Data
Jul. 3, 2019 (JP) .................................. 2019-124564

(51) Int. Cl.
*G02B 6/255* (2006.01)
*G02B 6/26* (2006.01)
(Continued)

(52) U.S. Cl.
CPC ........... *G02B 6/2558* (2013.01); *G02B 6/264* (2013.01); *H01S 3/005* (2013.01); *H01S 3/2383* (2013.01);
(Continued)

(58) Field of Classification Search
CPC .. G02B 6/2551; G02B 6/2553; G02B 6/2558; G02B 6/264; G02B 6/4296; H01S 3/005; H01S 3/2383; H01S 3/302
See application file for complete search history.

(56) References Cited

U.S. PATENT DOCUMENTS 6,249,633 B1 6/2001 Wittmeier et al.
6,490,389 B1 12/2002 Goodwin et al.
(Continued)

FOREIGN PATENT DOCUMENTS

JP 2004-086127 A 3/2004
JP 2011-186399 A 9/2011
(Continued)

OTHER PUBLICATIONS

Written Opinion issued in corresponding International Application No. PCT/JP2020/012915 dated Jun. 16, 2020 (7 pages), with translation.
(Continued)

*Primary Examiner* — Ryan A Lepisto
(74) *Attorney, Agent, or Firm* — Osha Bergman Watanabe & Burton LLP

(57) ABSTRACT

An optical fiber fuse protection device includes an upstream optical fiber disposed on an upstream side, a downstream optical fiber disposed on a downstream side, and a wall interposed between a part of the upstream optical fiber and a part of the downstream optical fiber. The downstream optical fiber is fusion-spliced to the upstream optical fiber and is made of a single optical fiber or a plurality of optical fibers fusion-spliced to each other.

15 Claims, 5 Drawing Sheets

(51) Int. Cl.
*H01S 3/00* (2006.01)
*H01S 3/23* (2006.01)
*G02B 6/42* (2006.01)
*H01S 3/30* (2006.01)

(52) U.S. Cl.
CPC .......... *G02B 6/2551* (2013.01); *G02B 6/2553* (2013.01); *G02B 6/4296* (2013.01); *H01S 3/302* (2013.01)

(56) References Cited

U.S. PATENT DOCUMENTS

| | | | |
|---|---|---|---|
| 9,841,348 B2* | 12/2017 | Rapp | .................. H04B 10/0791 |
| 2009/0092358 A1 | 4/2009 | Watanabe et al. | |
| 2015/0377737 A1* | 12/2015 | Rapp | ...................... G01M 11/30 |
| | | | 250/227.15 |

FOREIGN PATENT DOCUMENTS

| | | |
|---|---|---|
| JP | 2012-127903 A | 7/2012 |
| JP | 2017-111173 A | 6/2017 |
| WO | 2010/041564 A1 | 4/2010 |

OTHER PUBLICATIONS

Raman Kashyap, "The Fiber Fuse—from a curious effect to a critical issue: A 25th year retrospective", Optics Express vol. 21, No. 5, p. 6422, 2013 (21 pages).

International Search Report issued in corresponding International Application No. PCT/JP2020/012915, dated Jun. 16, 2020 (2 pages).

* cited by examiner

A-A'

B-B'

C-C'

D-D'

OPTICAL FIBER FUSE PROTECTION DEVICE, LASER DEVICE, AND METHOD

TECHNICAL FIELD

The present invention relates to an optical device which includes an upstream optical fiber and a downstream optical fiber fusion-spliced to each other and in which optical fiber fuse can occur.

BACKGROUND

An optical fiber, which has a low optical loss, can guide light therethrough for a long distance. Herein, when an optical fiber is viewed along a waveguiding direction of light, a side of the optical fiber which side is closer to a light source is called an upstream side, and a side of the optical fiber which side is farther from the light source is called a downstream side. A direction extending from the upstream side to the downstream side is called a forward direction, and a direction extending from the downstream side to the upstream side is called a backward direction. The low optical loss means, in other words, a small amount of heat generation. Thus, without any trigger, an optical fiber that is guiding light therethrough would probably not increase its temperature by itself.

However, in the optical fiber that is guiding light therethrough, a phenomenon called "optical fiber fuse", which involves heat generation and light emission, is known to be triggered by some kind of external factor (see, e.g., Non-Patent Literature 1). The heat generation and the light emission are caused by plasma generated in the core of the optical fiber. In many cases, for the purpose of protection of the optical fiber, the optical fiber has an external surface provided with a coating layer made of a resin material. In this case, the coating layer may occasionally be burnt by the heat caused by the optical fiber fuse.

Furthermore, in a case where optical fiber fuse occurs, the position of the optical fiber fuse moves continuously from the starting position where the optical fiber fuse has occurred toward the upstream side of the optical fiber. Along with the upstream movement of the position of the optical fiber fuse, the coating layer may also be burnt and let the fire spread toward the upstream side in some cases.

Patent Literature 1 discloses, in FIG. 2, a technique for stopping the upstream movement of the position of the optical fiber fuse. This technique provides an optical fiber including a certain section that has a larger mode field diameter than those of the other sections and accordingly has a lower light energy density than those of the other sections. With this, even if optical fiber fuse moves toward the upstream side, the optical fiber fuse stops moving at the certain section.

Meanwhile, Patent Literature 2 discloses, in FIG. 1, a technique for stopping a light source (described as a "high-power light source" in Patent Literature 2) upon detection of optical fiber fuse. This technique detects, with a photodetector (described as a "light receiver" in Patent Literature 2), light emission caused by the optical fiber fuse, so as to detect occurrence of the optical fiber fuse. In accordance with the detection result, this technique stops the light source.

CITATION LIST

Patent Literature

[Patent Literature 1] Japanese Patent Application Publication Tokukai No. 2004-86127
[Patent Literature 2] Japanese Patent Application Publication Tokukai No. 2012-127903

Non-Patent Literature

[Non-Patent Literature 1]
Raman Kashyap, "The Fiber Fuse—from a curious effect to a critical issue: A 25th year retrospective", OPTICS EXPRESS Vol. 21, No. 5, p. 6422, 2013.

Summary

Incidentally, assuming a case of an optical fiber that guides an optical signal therethrough in the field of optical communication, each of the techniques disclosed in Patent Literatures 1 and 2 takes a measure against optical fiber fuse. Meanwhile, also in the field of laser processing that uses laser light to process an object that is being processed (hereinafter, referred to as an "processing object"), optical fiber fuse can occur in an optical fiber that guides laser light therethrough.

(Configuration of Laser Device)

With reference to FIG. 12, the following will describe optical fiber fuse that can occur in a laser device used for laser processing. FIG. 12 is a block diagram of a laser device 101, which is a conventional laser device.

As shown in FIG. 12, the laser device 101 includes n laser light sources LS1 to LSn (n is an integer of not less than 2), an output combiner OC, an output head OH, and a base section B.

Each laser light source LSi (i is an natural number of not less than 1 and not more than n) includes a laser delivery fiber LDFi constituting an output port that outputs laser light having been oscillated.

The base section B is a plate-like member on which parts of the laser delivery fibers LDFi of the laser light sources LSi, the output combiner OC, and a part of an output delivery fiber ODF are to be mounted. The laser device 101 further includes a housing (not shown in FIG. 12) which covers the base section B and in which the laser light sources LSi and the output combiner OC are accommodated.

The output combiner OC includes n input ports IP1 to IPn and an output port OP. The output combiner OC is configured to combine, into a single beam of light, beams of light coupled to the input ports IPi and to couple, to the output port OP, the single beam of light obtained through the combining. The input ports IPi and the output port OP are each made of an optical fiber. The input ports IPi respectively have entrance ends fusion-spliced to exit ends of the laser delivery fibers LDFi. Consequently, fusion-splicing points PFi are formed. Thus, to the entrance ends of the input ports IPi, beams of laser light oscillated by the laser light sources LSi are coupled. The output combiner OC combines, into a single beam of laser light, n beams of laser light coupled to the input ports IPi, and couples, to the output port OP, the single beam of light obtained through the combining.

The output head OH includes an output delivery fiber ODF that functions as an input port and an optical system (not shown in FIG. 12). The output delivery fiber ODF has an entrance end fusion-spliced to an exit end of the output port OP. Consequently, a fusion-splicing point PFO is formed. The output head OH controls, with use of the optical system (not shown in FIG. 12), a light path of laser light L having been output from an exit end of the output delivery fiber ODF so as to irradiate, with the laser light L, a processing object W.

Herein, a plurality of optical fibers fusion-spliced in series to each other are referred to as an optical device, in order to discriminate the plurality of optical fibers from a single optical fiber. The laser delivery fibers LDFi and the input ports IPi that are fusion-spliced to each other via the respective fusion-splicing points PFi are one of multiple embodiments of the optical device, and the output port OP and the output delivery fiber ODF that are fusion-spliced to each other via the fusion-splicing point PFO are also one of multiple embodiments of the optical device.

The optical fibers constituting the laser device 101, i.e., the laser delivery fibers LDFi, the input ports IPi, the output port OP, and the output delivery fiber ODF each have a surplus-length section, which is a section for securing a surplus length. If a malfunction occurs in any of the laser light sources LSi and the output combiner OC, the malfunctioned one of the laser light sources LSi and the output combiner OC is replaced with a new one. For example, if a malfunction occurs in the laser light source LS1, the input port IP1 of the output combiner OC is cut at a position in the vicinity of the fusion-splicing point PF1 so as to yield a new entrance end of the input port IP1. Then, the new entrance end of the input port IP1 is fusion-spliced to an exit end of a laser delivery fiber LDF1 of a new laser light source LSi. In this manner, the malfunctioned laser light source LS1 is replaced with the new laser light source LS1. Every time the fusion-splicing is carried out in this manner, the optical fiber is shortened. In order to deal with this, the optical fiber is preliminarily provided with the surplus-length section. Specifically, (1) the laser delivery fibers LDFi each have a surplus-length section ELDFi, (2) the input ports IPi each have a surplus-length section IPi, (3) the output port OP has a surplus-length section EOP, and (4) the output delivery fiber ODF has a surplus-length section EODF. Each of the surplus-length sections ELDFi, IPi, EOP, and EODF is wound into a coil form and is placed on a surface of the base section B, for the purpose of (i) saving as much as possible the space required for accommodation and (ii) putting the space inside the housing in order.

For such a laser device 101, there is a strong demand for reduction in size of the device. Thus, in the laser device 101, the surplus-length section EOP of the output port OP and the surplus-length section EODF of the output delivery fiber ODF are each likely to be arranged overlappedly in a smaller area (as if each of the surplus-length sections EOP and EODF constituted a single coil) (see the insert indicated by the arrow in FIG. 12). Similarly, the surplus-length sections ELDFi of the laser delivery fibers LDFi are often arranged overlappedly in a small area, and the surplus-length sections EIPi of the input ports IPi are often arranged overlappedly in a small area.

(Optical Fiber Fuse)

In the laser device 101, most of the laser light L emitted from the output head OH toward the processing object W is consumed as energy for processing, and/or is absorbed into the processing object W and is then converted into heat. However, part of the laser light L is reflected by the processing object W so as to be turned into reflected light R, which returns toward the output head OH. Part of the reflected light R can be coupled again to the exit end of the output delivery fiber ODF via the above-described optical system, so as to be turned into returning light propagating through the output delivery fiber ODF in the backward direction. In this case, the laser light propagating through the output delivery fiber ODF in the forward direction and the reflected light propagating through the output delivery fiber ODF in the backward direction are confined in the core of the output delivery fiber ODF.

Consequently, due to the reflected light propagating through the output delivery fiber ODF in the backward direction, optical fiber fuse may occur in any position (herein, the position P1 shown in FIG. 12) of the output delivery fiber ODF.

In the field of optical communication as disclosed in Patent Literatures 1 and 2, an optical signal transmitted through the optical fiber has a small energy. Therefore, even if optical fiber fuse occurs, the influence of the optical fiber fuse is likely to be limited to the vicinity of the core of the optical fiber, and rarely reaches the coating layer. Meanwhile, in the field of laser processing, the energy of laser light transmitted through the optical fiber is far greater than that in the field of optical communication. Therefore, if optical fiber fuse occurs, the influence of the optical fiber fuse often reaches the coating layer, not remaining in the vicinity of the core. Consequently, in many cases, the optical fiber is melted and broken (i.e., melted down).

As described above, the optical fiber fuse propagates from the position P1 in the backward direction along the output delivery fiber ODF, so as to reach the surplus-length section EODF of the output delivery fiber ODF. As described above, in the surplus-length section EODF, the output delivery fiber ODF is wound into a coil form so as to be disposed at a higher density than those in the other sections.

Therefore, the coating layer may easily be burnt and/or the output delivery fiber ODF may easily be melted down. Consequently, the bending stress of the optical fiber wound into a coil form is released at the melted down. Accordingly, the cut end of the output delivery fiber ODF may move outwardly from the coil form. In addition, along with the movement of the cut-down part, the burning part of the coating layer may leap. Due to the movement of the cut end or the leaping of the burning part of the coating layer, the fire may occasionally leap from the position (herein, the position P2 shown in FIG. 12) where the surplus-length section EODF resides to the position (herein, the position P3 shown in FIG. 12) where the surplus-length section EOP of the output port OP of the output combiner OC resides.

The leaping of the fire from the surplus-length section EODF to the surplus-length section EOP is more likely to occur in a case where the surplus-length section EOP and the surplus-length section EODF are arranged so as to overlap each other in a smaller area as shown in the insert in FIG. 12.

If optical fiber fuse occurs in any of the input ports IP1 to IPn of the output combiner OC, similar leaping of fire may occur between the surplus-length section EIPi and the surplus-length sections ELDFi.

(Repair)

Here, in a case (i.e., a first case) where burning of the coating layer caused by the optical fiber fuse stops within the range of the surplus-length section EODF, the laser device 101 may be repaired merely by replacing the output head OH alone. Specifically, the optical head OH in which the optical fiber fuse has occurred may be disconnected from the fusion-splicing point PFO. Then, an entrance end of an output delivery fiber ODF of a new output head OH may be fusion-spliced to the exit end of the output port OP. Thus, if the laser device detects occurrence of the optical fiber fuse, the laser device quickly controls the laser light sources LSi so that outputs from the laser light sources LSi are reduced or become zero, for the purpose of minimizing the range to be burnt.

However, even if the effort is made to minimize the range to be burnt, the fire caused by the optical fiber fuse may leap to the surplus-length section EOP, depending on the position where the optical fiber fuse occurs, the speed at which the optical fiber fuse moves toward the upstream side, and/or the like. In a case (i.e., a second case) where the leaping of the fire occurs, the laser device 101 would be repaired by replacing the output head OH and the output combiner OC with new ones. Specifically, the output head OH in which the optical fiber fuse has occurred as well as the output combiner OC are disconnected from the fusion-splicing points PFi. Then, entrance ends of input ports IPi of a new output combiner OC are fusion-spliced to the exit ends of LDFi, and an entrance end of an output delivery fiber ODF of a new output head OH is fusion-spliced to an exit end of an output port OP of the new output combiner OC.

According to a comparison between the first case and the second case, the first case involves a lower repair cost, a shorter period of time taken for repair, and more easiness in repair.

Thus, there has been a demand for a technique for reducing, in a case where optical fiber fuse occurs in a downstream optical fiber of an optical device, an influence of the optical fiber fuse that can be given to an upstream optical fiber of the optical device, the optical device including (a) the upstream optical fiber disposed on an upstream side and (b) the downstream optical fiber that is disposed on a downstream side and that is fusion-spliced to the upstream optical fiber.

One or more embodiments of the invention relates to an optical fiber fuse protection device including: an upstream optical fiber disposed on an upstream side; a downstream optical fiber disposed on a downstream side, the downstream optical fiber being fusion-spliced to the upstream optical fiber and being made of a single optical fiber or a plurality of optical fibers fusion-spliced to each other; and a wall interposed between a part of the upstream optical fiber and a part of the downstream optical fiber.

One or more embodiments of the invention relates to a method for reducing, in a case where optical fiber fuse occurs in any position of a downstream optical fiber of an optical device, an influence of the optical fiber fuse that can be given to an upstream optical fiber of the optical device, the optical device including (a) the upstream optical fiber disposed on an upstream side and (b) the downstream optical fiber disposed on a downstream side, the downstream optical fiber being fusion-spliced to the upstream optical fiber and being made of a single optical fiber or a plurality of optical fibers fusion-spliced to each other, said method including the step of: disposing a wall at a location between a part of the upstream optical fiber and a part of the downstream optical fiber so that the upstream optical fiber and the downstream optical fiber are shielded from each other.

Advantageous Effects of Invention

In accordance with one or more embodiments of the present invention, in a case where, in an optical device including an upstream optical fiber and a downstream optical fiber, optical fiber fuse occurs in the downstream optical fiber, it is possible to reduce the influence that the optical fiber fuse can give to the upstream optical fiber.

DETAILED DESCRIPTION

In optical fiber fuse protection devices in accordance with various embodiments of the present invention, a method for reducing an influence of optical fiber fuse is carried out. The method is a method for reducing, in a case where optical fiber fuse occurs in any position of a downstream optical fiber of an optical device, an influence of the optical fiber fuse that can be given to an upstream optical fiber of the optical device, the optical device including (a) the upstream optical fiber disposed on an upstream side and (b) the downstream optical fiber that is disposed on a downstream side and that is fusion-spliced to the upstream optical fiber, said method including the step of: disposing a wall at a location between the upstream optical fiber and the downstream optical fiber so that the upstream optical fiber and the downstream optical fiber are shielded from each other.

Figure 12:
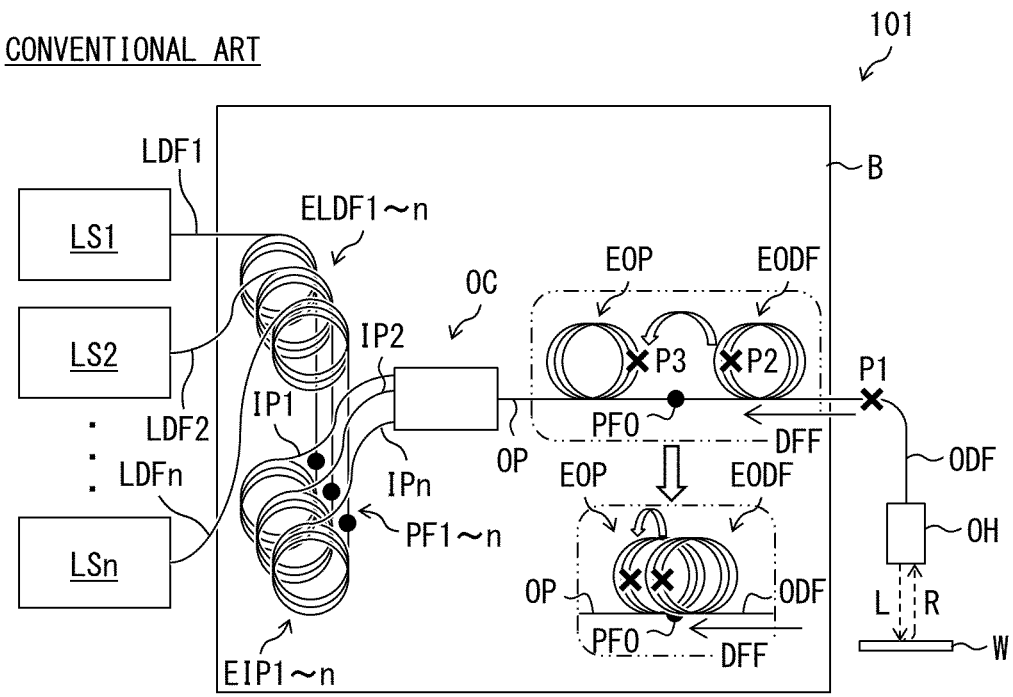
FIG. 12 is a block diagram of a conventional laser device. The insert is a block diagram of a variation of the conventional optical fiber fuse protection device.

A method in accordance with one or more embodiments of the present invention for reducing an influence of optical fiber fuse can be applied to the conventional laser device 101 such as the one shown in FIG. 12, for example. With this, even if optical fiber fuse occurs in any position of the downstream optical fiber and accordingly the downstream optical fiber is heated to an excessively high temperature, an optical fiber fuse protection device in accordance with one or more embodiments can reduce the influence that the upstream optical fiber can receive from the downstream optical fiber having been heated to an excessively high temperature. More specifically, even in a case where the coating layer that covers an external surface of the downstream optical fiber and that is made of a resin material is heated to a high temperature and consequently ignition is caused, the optical fiber fuse protection device in accordance with one or more embodiments can reduce the risk that the fire may leap from the downstream optical fiber to the upstream optical fiber. Therefore, even in a case where optical fiber fuse occurs in the downstream optical fiber, the optical fiber fuse protection device in accordance with one or more embodiments can minimize the damage of the optical device caused by the optical fiber fuse.

With reference to the drawings, the following description will discuss optical fiber fuse protection devices in accordance with various embodiments of the present invention to which the method for reducing the influence of the optical fiber fuse is applied. Note that the method for reducing the influence of the optical fiber fuse is carried out commonly in the embodiments. Therefore, in each of the embodiments, the explanation of the method for reducing the influence of the optical fiber fuse will not be repeated.

Embodiment 1

Figure 1:
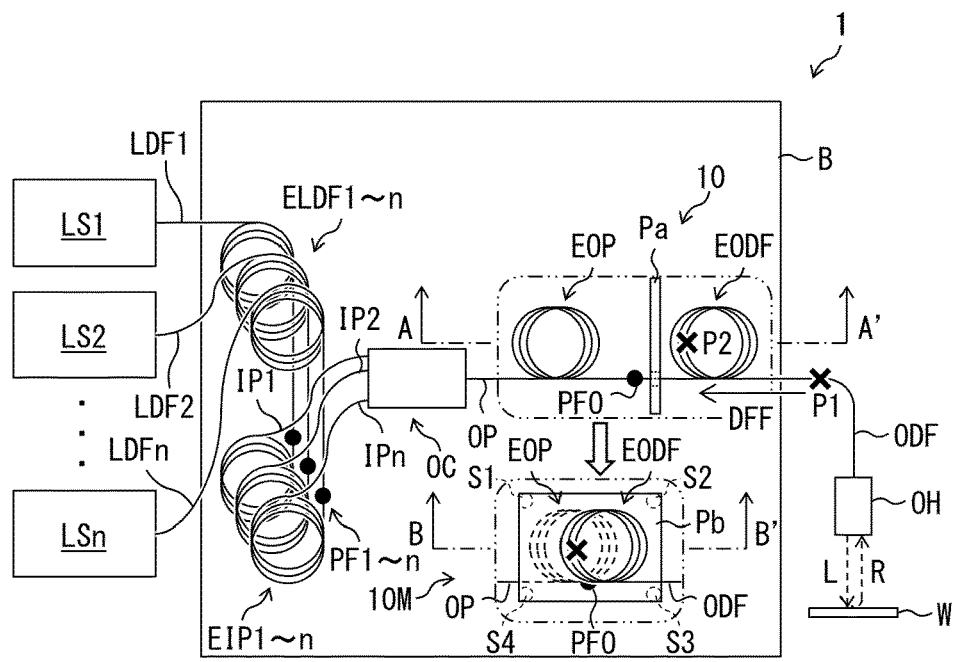
FIG. 1 is a block diagram of a laser device including an optical fiber fuse protection device in accordance with Embodiment 1 of the present invention. The insert is a block diagram of a variation of the optical fiber fuse protection device.
Figure 2:
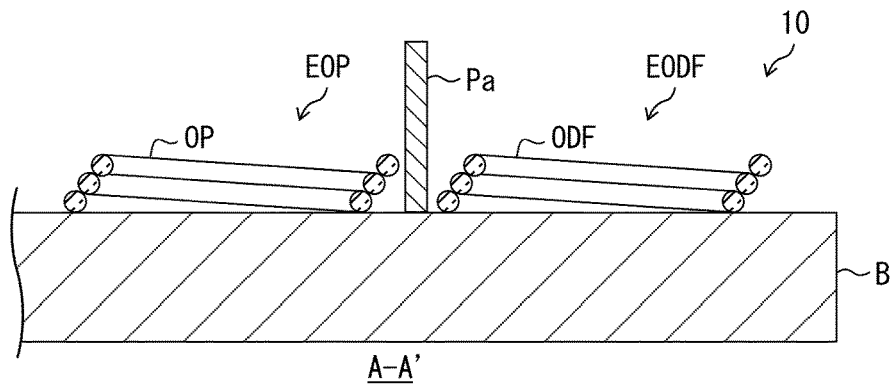
FIG. 2 is a cross-sectional view of the optical fiber fuse protection device shown in FIG. 1.

With reference to FIGS. 1 and 2, a laser device 1 including an optical fiber fuse protection device 10 in accordance with Embodiment 1 of the present invention will be described. With reference to the insert in FIG. 1 and FIG. 3, an optical fiber fuse protection device 10M, which is a variation of the optical fiber fuse protection device 10, will be described. The laser device 1 is a laser processing device configured to process a processing object W by irradiating the processing object W with laser light L.

Figure 3:
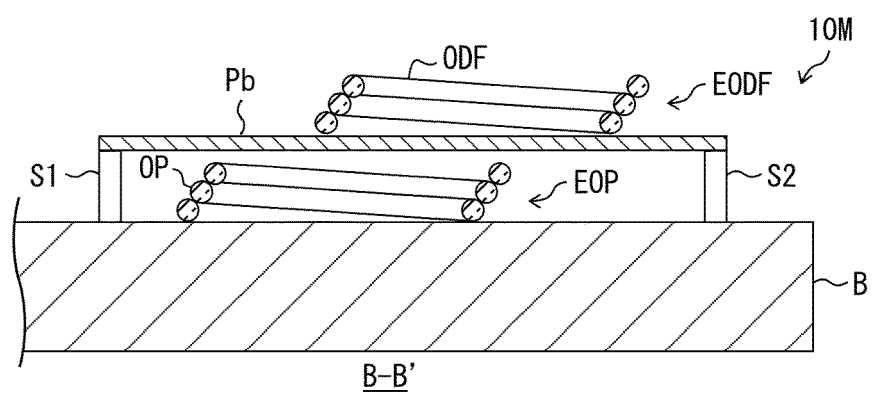
FIG. 3 is a cross-sectional view of the variation of the optical fiber fuse protection device shown in the insert in FIG. 1.

FIG. 1 is a block diagram of the laser device 1. The insert in FIG. 1 is a block diagram of the optical fiber fuse protection device 10M. FIG. 2 is a cross-sectional view of the optical fiber fuse protection device 10, which cross-sectional view shows a cross section A-A' taken along line A-A' shown in FIG. 1. FIG. 3 is a cross-sectional view of the optical fiber fuse protection device 10M, which cross-sectional view shows a cross section B-B' taken along line B-B' shown in FIG. 1.

<Configuration of Laser Device 1>

As shown in FIG. 1, the laser device 1 includes n laser light sources LS1 to LSn (n is an integer of not less than 2), an output combiner OC, an output head OH, and a base section B. As will be described later, the output combiner OC includes an output port OP, and the output head OH includes an output delivery fiber ODF. In the optical fiber fuse protection device 10, the output port OP is employed as one of multiple embodiments of the upstream optical fiber recited in the claims, and the output delivery fiber ODF is employed as one of multiple embodiments of the downstream optical fiber recited in the claims. Thus, the laser device 1 can also be expressed as including the optical fiber fuse protection device 10.

In Embodiment 1, the description of the output delivery fiber ODF will be given by taking, as an example, the optical fiber fuse protection device 10 (see FIG. 1) including the output delivery fiber ODF made of a single optical fiber. Alternatively, in one or more embodiments of the present invention, the output delivery fiber ODF may be made of a plurality of optical fibers which are arranged in series along a waveguiding direction of light and adjacent ones of which have respective ends fusion-spliced to each other. In one example of the output delivery fiber ODF made of such a plurality of optical fibers, an optical member having some kind of function and including optical fibers respectively constituting an input port and an output port (e.g., optical fibers each provided with a cladding mode stripper) is inserted into any position in an intermediate part of the output delivery fiber ODF. The number of such optical members inserted into the output delivery fiber ODF may be one or two or more.

Each laser light source LSi (i is a natural number of not less than 1 and not more than n) includes a laser light source body configured to oscillate laser light and a laser delivery fiber LDFi that is optically coupled to the laser light source body and that constitutes an output port configured to output the laser light having been oscillated. In Embodiment 1, a fiber laser is used as each laser light source LSi.

The wavelength of the laser light can be set as appropriate. If it is assumed that the laser device 1 is used in the field of laser processing, laser light having a wavelength within an infrared range is employed, typically, laser light having a wavelength within a wavelength band of not less (i.e., greater than or equal to) than 1000 nm and not more than 1100 nm is employed. Embodiment 1 deals with the laser device 1 that emits laser light having a wavelength of 1070 nm.

The fiber laser used as each laser light source LSi may be a resonator type fiber laser or a master oscillator-power amplifier (MOPA) fiber laser. In other words, the fiber laser may be a continuous-wave type fiber laser or a pulsed oscillation type fiber laser. Alternatively, each laser light source LSi may be a laser device other than the fiber laser. Each laser light source LSi may be any laser device, e.g., a solid laser, a liquid laser, or a gas laser.

Arrangement of the laser light sources LSi is not limited to any particular one. For example, the laser light sources LSi may be arranged such that the laser light sources LSi are stacked vertically. Alternatively, the laser light sources LSi may be arranged such that the laser light sources LSi do not overlap each other on a certain plane. In Embodiment 1, the laser light sources LSi may be arranged in an area that is not included in the base section B (described later). Alternatively, the laser light sources LSi may be arranged in any area on the base section B.

The base section B is a plate-like member on which parts of the laser delivery fibers LDFi of the laser light sources LSi, the output combiner OC, and a part of an output delivery fiber ODF are to be mounted. In (a) the optical members such as cladding mode strippers inserted into at least parts of the output combiner OC (described later), the output port OP of the output combiner OC, the output delivery fiber ODF (described later), and/or the like as well as (b) a plurality of fusion-splicing points, representative examples of which encompass the fusion-splicing points PFi and PFO, the power of laser light oscillated by the laser light sources LSi becomes high (i.e., the power of the laser device 1 is high) and therefore the temperatures therein are likely to become high. It is preferable that the base section B be provided with a cooling mechanism for cooling the output combiner OC, the output port OP, the output delivery fiber ODF, and/or the like. It is also preferable that the base section B be made of a metal (e.g., copper or aluminum) having high thermal conductivity in order to enhance cooling efficiency. The cooling mechanism provided to the base section B is not limited to any particular one, and may be selected as appropriate from existing cooling mechanisms. The laser device 1 may further include a housing (not shown in FIG. 1) which covers the base section B and in which the laser light sources LSi and the output combiner OC are accommodated.

The output combiner OC includes the n input ports IP1 to IPn, a combiner body constituted by the optical member, and the output port OP drawn out from the combiner body. The combiner body combines, into a single beam of light, the beams of light coupled to the input ports IPi, and couples, to the output port OP, the single beam of light obtained through the combining. The input ports IPi and the output port OP are each made of an optical fiber.

The input ports IPi have entrance ends fusion-spliced to exit ends of the laser delivery fibers LDFi, respectively. Consequently, fusion-splicing points PFi are formed. Thus, to the entrance ends of the input ports IPi, beams of laser light oscillated by the laser light sources LSi are coupled. The output combiner OC combines, into a single beam of laser light, n beams of laser light coupled to the input ports IPi, and couples, to the output port OP, the single beam of light obtained through the combining.

The output head OH includes the output delivery fiber ODF that functions as the input port and an optical system (not shown in FIG. 1). The output delivery fiber ODF has an entrance end fusion-spliced to an exit end of the output port OP. Consequently, a fusion-splicing point PFO is formed. At the fusion-splicing point PFO, the exit end of the output port OP and the entrance end of the output delivery fiber ODF are fusion-spliced to each other so that the core of the output port OP and the core of the output delivery fiber ODF are coupled to each other and the cladding of the output port OP and the cladding of the output delivery fiber ODF are coupled to each other. The output head OH controls, with use of the optical system (not shown in FIG. 1), a light path of laser light L having been output from the exit end of the output delivery fiber ODF so as to irradiate the processing object W with the laser light L.

The optical fibers constituting the laser device 1, that is, the laser delivery fibers LDFi, the input ports IPi, the output port OP, and the output delivery fiber ODF each have a surplus-length section, which is a section for securing a surplus length. Specifically, (1) the laser delivery fibers LDFi each have a surplus-length section ELDFi, (2) the input ports IPi each have a surplus-length section EIPi, (3) the output port OP has a surplus-length section EOP, and (4) the output delivery fiber ODF has a surplus-length section EODF. Each of the surplus-length sections ELDFi, EIPi, EOP, and EODF is wound into a coil form and is placed on a surface of the base section B, for the purpose of (i) saving as much as possible the space required for accommodation and (ii) putting the space inside the housing in order.

Also for such a laser device 1, there is a strong demand for reduction in size of the device. In order to reduce the size of the laser device 1, the laser device 1 may be configured such that each of the surplus-length section EOP of the output port OP and the surplus-length section EODF of the output delivery fiber ODF is arranged overlappedly in a smaller area (as if each of the surplus-length sections EOP and EODF constituted a single coil). The insert indicated by the arrow in FIG. 1 shows the optical fiber fuse protection device 10M, which is a variation of the optical fiber fuse protection device 10 and in which each of a surplus-length section EOP and a surplus-length section EODF is arranged overlappedly in a smaller area when the base section B is viewed in a direction normal to the surface of the base section B.

In the laser device 1, similarly to the surplus-length section EOP and the surplus-length section EODF, the surplus-length sections ELDFi of the laser delivery fibers LDFi are arranged overlappedly in a small area and the surplus-length sections EIPi of the input ports IPi are arranged overlappedly in a small area, for the purpose of reducing the size of the laser device 1. In one or more embodiments of the present invention, the laser delivery fibers LDFi can be employed as one of multiple embodiments of the upstream optical fiber, and the input ports IPi can be employed as one of multiple embodiments of the downstream optical fiber, as will be described later with reference to FIG. 10.

<Configuration of Optical Fiber Fuse Protection Device 10>

As described above, in the laser device 1, the output port OP of the output combiner OC is one of multiple embodiments of the upstream optical fiber, and the output delivery fiber ODF of the output head OH is one of multiple embodiments of the downstream optical fiber.

As shown in FIGS. 1 and 2, the optical fiber fuse protection device 10 includes the output port OP, the output delivery fiber ODF, and a partition wall Pa.

The partition wall Pa is one of multiple embodiments of the wall interposed between the surplus-length section EOP, which is a part of the output port OP, and the surplus-length section EODF, which is a part of the output delivery fiber ODF. The partition wall Pa is preferably made of a flame retardant material. In Embodiment 1, the partition wall Pa is made of a metal (e.g., copper or aluminum), which is one example of the flame retardant material. The partition wall Pa is fixed onto the surface of the base section B so as to extend upward therefrom so that a main surface of the partition wall Pa intersects the surface of the base section B (in Embodiment 1, orthogonally). With this, the output port OP and the output delivery fiber ODF are shielded from each other by the partition wall Pa. The partition wall Pa may be fixed to the base section B by fixing means such as a bolt, an adhesive, welding, or soldering.

In Embodiment 1, the partition wall Pa is a rectangular plate-like member. When the base section B is viewed in the direction normal to the base section B, the partition wall Pa is disposed so as to intersect the output delivery fiber ODF. In other words, when the base section B is viewed in the direction normal to the base section B, the partition wall Pa overlaps a part of the output delivery fiber ODF. The partition wall Pa has a portion (in Embodiment 1, a portion of a long side of the rectangular partition wall Pa which long side is in contact with the base section B) including a cutout through which the output delivery fiber ODF can pass. In FIG. 1, this cutout is not given a reference sign, and is indicated by the dotted lines. In Embodiment 1, as shown in FIG. 2, the partition wall Pa is disposed between the surplus-length section EOP, which is a part of the output port OP, and the surplus-length section EODF, which is a part of the output delivery fiber ODF, so that the surplus-length section EODF and the surplus-length section EOP are shielded from each other.

The shape of the partition wall Pa is not limited to the rectangular shape described above, and may be selected as appropriate. In Embodiment 1, the partition wall Pa is disposed at a location that is included in a section between the surplus-length sections EOP and EODF, that is downstream of the fusion-splicing point PFO, and that overlaps the output delivery fiber ODF. Alternatively, the partition wall Pa may be disposed at a location that is included in the section between the surplus-length sections EOP and EODF, that is upstream of the fusion-splicing point PFO, and that overlaps the output port OP. The partition wall Pa can be disposed so that at least a part of the surplus-length section EODF and at least a part of the surplus-length section EOP are shielded from each other.

When the base section B is viewed in the direction normal to the base section B, the partition wall Pa can be disposed at least between the surplus-length sections EOP and EODF (more preferably, so that the surplus-length section EOP and the surplus-length section EODF are shielded from each other). Therefore, a part of the partition wall Pa shown in FIG. 1 which part is lower in height than the output delivery fiber ODF may be omitted. That is, the partition wall Pa may be disposed so as not to overlap the output port OP or the output delivery fiber ODF.

<Configuration of Optical Fiber Fuse Protection Device 10M>

As described above, the optical fiber fuse protection device 10M is configured such that each of a surplus-length section EOP and a surplus-length section EODF is arranged overlapping in an area smaller than that in the optical fiber fuse protection device 10 when a surface of a base section B is viewed in a direction normal to the surface. The optical fiber fuse protection device 10M can be reduced in size, as compared to the optical fiber fuse protection device 10.

In the optical fiber fuse protection device 10M, an area where the surplus-length section EOP is disposed and an area where the surplus-length section EODF is disposed so as to overlap each other, when the base section B is viewed in the direction normal to the base section B. Therefore, the optical fiber fuse protection device 10M cannot employ a partition wall (e.g., the partition wall Pa of the optical fiber fuse protection device 10) fixed to the surface of the base section B so as to extend upward therefrom.

Thus, the optical fiber fuse protection device 10M employs a partition wall Pb shown in FIG. 3 as the wall interposed between the output port OP and the output delivery fiber ODF.

The partition wall Pb is fixed to the base section B with four columnar members S1 to S4, so that a main surface of the partition wall Pb is laid along (in Embodiment 1, in parallel with) the surface of the base section B and the partition wall Pb is raised above the surface of the base section B. With this, the output port OP and the output delivery fiber ODF are shielded from each other by the partition wall Pb. The fixing means for fixing the partition wall Pb to the base section B is not limited to the columnar members S1 to S4.

In Embodiment 1, the partition wall Pb is a rectangular plate-like member. However, the shape of the partition wall Pb is not limited to the rectangular shape, but may be selected as appropriate. The partition wall Pb has a portion including an opening through which the output port OP or the output delivery fiber ODF can extend from the lower side of the partition wall Pb to the upper side of the partition wall Pb. In the insert in FIG. 1, this opening is not illustrated.

In Embodiment 1, as shown in FIG. 3, the partition wall Pb is disposed between the output port OP and the output delivery fiber ODF so that the surplus-length section EODF, which is a part of the output delivery fiber ODF, and the surplus-length section EOP, which is a part of the output port OP, are shielded from each other.

In the optical fiber fuse protection device 10M shown in FIG. 3, the output port OP and the output delivery fiber ODF are arranged to overlap each other such that the output port OP is disposed on the lower side and the output delivery fiber ODF is disposed on the upper side. However, this is not limitative. Either the output port OP or the output delivery fiber ODF may be disposed on the upper side. However, with the configuration in which the output delivery fiber ODF is disposed on the upper side, the output delivery fiber ODF can easily be replaced with a new one when optical fiber fuse occurs in the output delivery fiber ODF.

Embodiment 2

Figure 4:
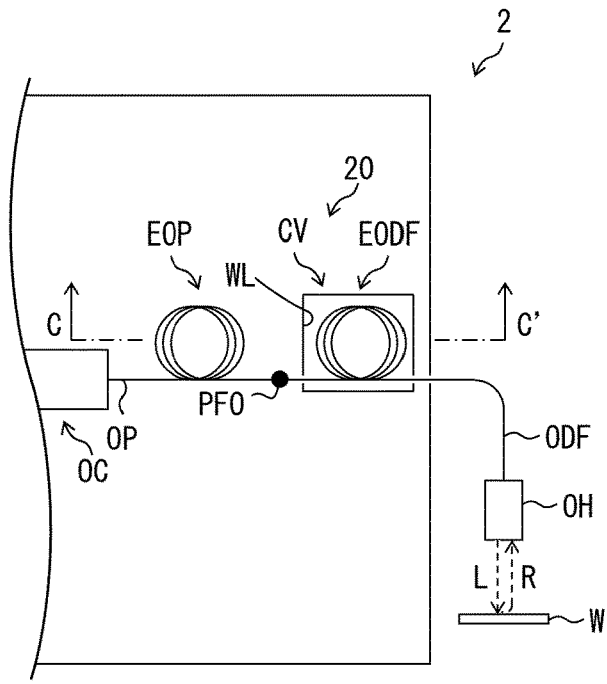
FIG. 4 is a block diagram of a laser device including an optical fiber fuse protection device in accordance with Embodiment 2 of the present invention.
Figure 5:
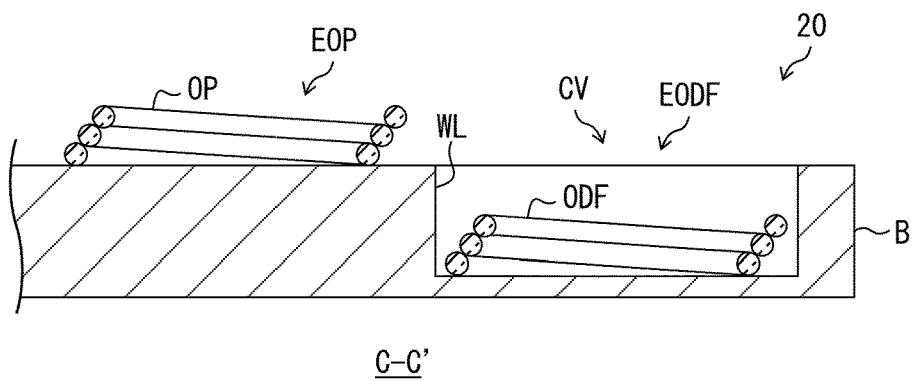
FIG. 5 is a cross-sectional view of the optical fiber fuse protection device shown in FIG. 4.
Figure 6:
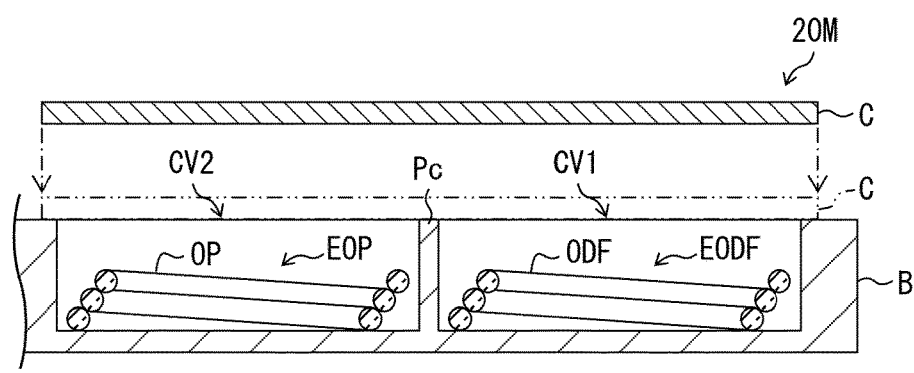
FIG. 6 is a cross-sectional view of a variation of the optical fiber fuse protection device shown in FIG. 4.

With reference to FIGS. 4 and 5, a laser device 2 including an optical fiber fuse protection device 20 in accordance with Embodiment 2 of the present invention will be described. With reference to FIG. 6, an optical fiber fuse protection device 20M, which is a variation of the optical fiber fuse protection device 20, will be described. Note that, for convenience, members having functions identical to those of the respective members described in Embodiment 1 are given respective identical reference numerals, and a description of those members is omitted here.

FIG. 4 is a block diagram of the laser device 2. FIG. 5 is a cross-sectional view of the optical fiber fuse protection device 20, which cross-sectional view shows a cross section C-C' taken along line C-C' shown in FIG. 4. FIG. 6 is a cross-sectional view of the optical fiber fuse protection device 20M.

<Configuration of Optical Fiber Fuse Protection Device 20>

As shown in FIGS. 4 and 5, the optical fiber fuse protection device 20 includes an output port OP and an output delivery fiber ODF.

When a base section B is viewed in a direction normal to the base section B, a surface of the base section B has an area which includes an area having a surplus-length section EODF of the output delivery fiber ODF disposed therein and in which a cavity CV is formed by engraving the surface of the base section B toward the inside of the base section B. The cavity CV is a rectangular parallelepiped recess that is formed in the base section B and that has a bottom wall and side walls.

The bottom wall is a wall that is formed along (in Embodiment 2, in parallel with) the surface of the base section B and that has a rectangular shape.

The side walls are four walls that surround the bottom wall from four sides and that are formed to intersect the surface of the base section B (in Embodiment 2, orthogonally). As shown in FIGS. 4 and 5, among the four walls surrounding the bottom wall from four sides, the wall positioned between the surplus-length section EOP of the output port OP and the surplus-length section EODF of the output delivery fiber ODF is called a wall WL.

As shown in FIG. 5, the surplus-length section EODF is disposed on a surface of the bottom wall of the cavity CV. That is, in the optical fiber fuse protection device 20, the wall WL is interposed between the output port OP and the output delivery fiber ODF.

As compared to the optical fiber fuse protection device 10, it cannot be said that, in the optical fiber fuse protection device 20, the output delivery fiber ODF and the output port OP are shielded from each other by the wall WL. Therefore, the degree of shielding of the output port OP and the output delivery fiber ODF in the optical fiber fuse protection device 20 is lower than that in the optical fiber fuse protection device 10.

However, if optical fiber fuse occurs in any position of the output delivery fiber ODF and the optical fiber fuse ODF is melted down, the cut end of the output delivery fiber ODF thus melted down moves, within a plane laid along the surface of the base section B, outwardly from its original position on the circumference of the coil form. This happens because the bending stress applied to the output delivery fiber ODF when the output delivery fiber ODF is wound into the coil form is released and accordingly the output delivery fiber ODF works as if it were a kind of spring.

As described above, the movement of the cut end of the output delivery fiber ODF caused by the bending stress applied to the output delivery fiber ODF takes place basically within the plane laid along the surface of the base section B. Therefore, if the fire leaps from a burning part of the coating layer which burning part is close to the cut end, the fire of the burning part of the coating layer leaps basically within the plane laid along the surface of the base section B and basically hardly leaps in a direction primarily intersecting the surface of the base section B. That is, even if the fire of the burning part of the coating layer leaps in a direction extending from the surplus-length section EODF to the surplus-length section EOP, the fire of the burning part of the coating layer merely collides with the wall WL in most cases, and cannot leap over the wall WL to reach the area where the output port OP resides.

Therefore, in the optical fiber fuse protection device 20, the wall WL, which merely surrounds the surplus-length section EODF laterally, can also suppress or reduce leaping of fire from the output delivery fiber ODF to the output port OP.

<Configuration of Optical Fiber Fuse Protection Device 20M>

The optical fiber fuse protection device 20M shown in FIG. 6 is configured as below. That is, when a base section B is viewed in a direction normal to the base section B, a surface of the base section B has (i) an area which includes an area having a surplus-length section EODF of an output delivery fiber ODF disposed therein and in which a cavity CV1 is formed and (ii) an area which includes an area having a surplus-length section EOP of an output port OP disposed therein and in which a cavity CV2 is formed. The cavity CV1 is identical to the cavity CV shown in FIG. 5. The cavity CV2 is identical to the cavity CV, except that the cavity CV2 is formed in a position different from that of the cavity CV.

The surplus-length section EODF is disposed on a surface of a bottom wall of the cavity CV1, and the surplus-length section EOP is disposed on a surface of a bottom wall of the cavity CV2. In the optical fiber fuse protection device 20M, a part of the base section B which part is interposed between the cavity CV1 and the cavity CV2 constitutes a partition wall Pc. As shown in FIG. 6, the partition wall Pc is disposed between the output port OP and the output delivery fiber ODF so that the surplus-length section EODF, which is a part of the output delivery fiber ODF, and the surplus-length section EOP, which is a part of the output port OP, are shielded from each other.

The optical fiber fuse protection device 20M configured as above can more reliably suppress or reduce leaping of fire from the output delivery fiber ODF to the output port OP, as compared to the optical fiber fuse protection device 20.

As shown in FIG. 6, the optical fiber fuse protection device 20M preferably further includes a cover C that is fixed to the base section B so as to cover openings of the cavities CV1 and CV2. The cover C may be fixed to the base section B by fixing means such as a bolt, an adhesive, welding, or soldering.

The cover C is a plate-like member, and is preferably made of a flame retardant material. In Embodiment 2, the cover C is made of a metal (e.g., copper or aluminum), which is one example of the flame retardant material. The cover C has (i) an area that faces the cavity CV1 and that has a first opening through which the output port OP can pass and (ii) an area that faces the cavity CV2 and that has a second opening through which the output port OP can pass. Note that the first and second openings are not illustrated in FIG. 6.

The optical fiber fuse protection device 20M provided with the cover C can more reliably suppress or reduce leaping of fire from the output delivery fiber ODF to the output port OP, as compared to the optical fiber fuse protection device 20M that is not provided with the cover C.

Embodiment 3

Figure 7:
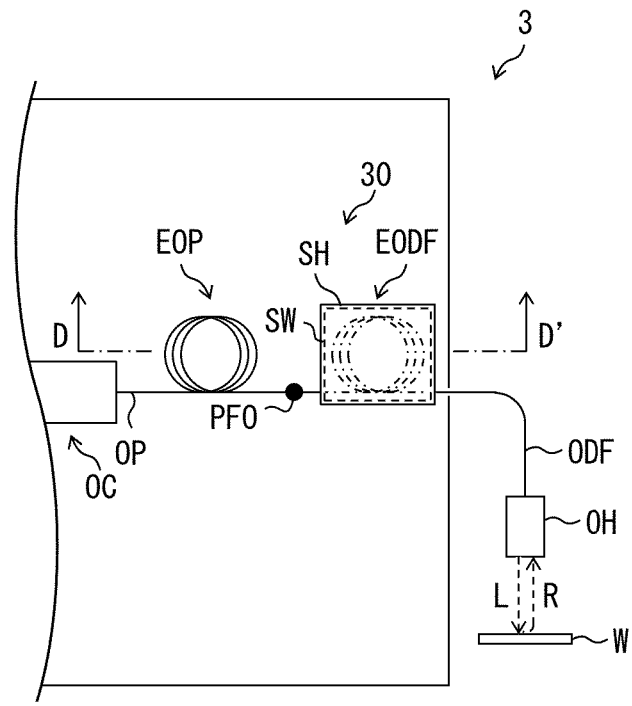
FIG. 7 is a block diagram of a laser device including an optical fiber fuse protection device in accordance with Embodiment 3 of the present invention.
Figure 8:
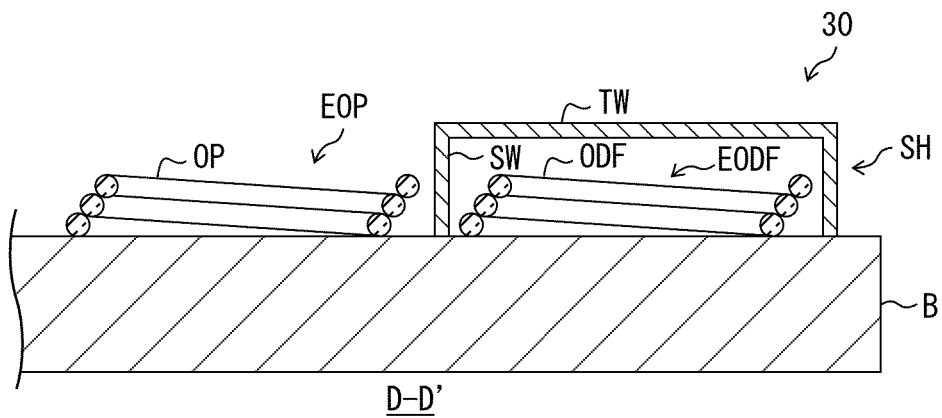
FIG. 8 is a cross-sectional view of the optical fiber fuse protection device shown in FIG. 7.
Figure 9:
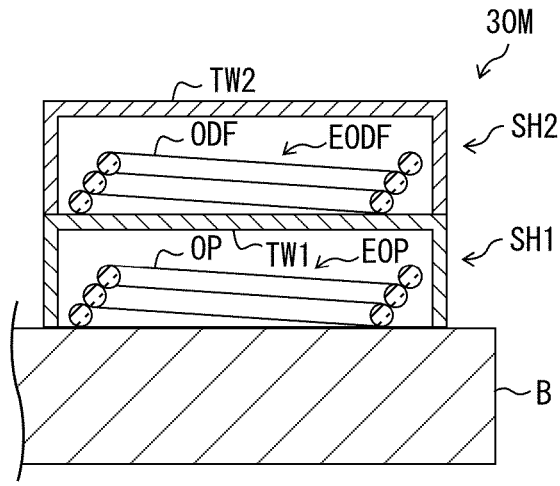
FIG. 9 is a cross-sectional view of a variation of the optical fiber fuse protection device shown in FIG. 7.

With reference to FIGS. 7 and 8, a laser device 3 including an optical fiber fuse protection device 30 in accordance with Embodiment 3 of the present invention will be described. With reference to FIG. 9, an optical fiber fuse protection device 30M, which is a variation of the optical fiber fuse protection device 30, will be described. Note that, for convenience, members having functions identical to those of the respective members described with Embodiments 1 and 2 are given respective identical reference numerals, and a description of those members is omitted here.

FIG. 7 is a block diagram of the laser device 3. FIG. 8 is a cross-sectional view of the optical fiber fuse protection device 30, which cross-sectional view shows a cross section D-D' taken along line D-D' shown in FIG. 7. FIG. 9 is a cross-sectional view of the optical fiber fuse protection device 30M.

<Configuration of Optical Fiber Fuse Protection Device 30>

As shown in FIGS. 7 and 8, the optical fiber fuse protection device 30 includes an output port OP and an output delivery fiber ODF.

When a base section B is viewed in a direction normal to the base section B, a surface of the base section B has an area which includes an area having a surplus-length section EODF of the output delivery fiber ODF disposed therein and to which a shell SH is fixed. The shell SH, which can be expressed as having a quadrangular container shape or a cap shape, covers the surplus-length section EODF. The shell SH may be fixed to the base section B by fixing means such as a bolt, an adhesive, welding, or soldering.

The shell SH is preferably made of a flame retardant material. In Embodiment 3, the cover C is made of a metal (e.g., copper or aluminum), which is one example of the flame retardant material.

The shell SH is constituted by a ceiling wall TW and side walls. In Embodiment 3, the ceiling wall TW has a rectangular shape. The side walls are four walls surrounding the ceiling wall TW from four sides. Here, from among a ceiling wall TW and a bottom wall constituting paired opposed main surfaces of a rectangular parallelepiped box-shaped hollow member, the bottom wall may be removed to achieve a shell SH having the above-described configuration.

In the optical fiber fuse protection device 30, the shell SH is disposed so that an opening (i.e., an opening formed by removal of the bottom wall) of the shell SH is in contact with the surface of the base section B and is located in the area including the area having the surplus-length section EODF disposed therein. Consequently, the shell SH covers the surplus-length section EODF.

As shown in FIG. 8, among the four walls surrounding the ceiling wall TW from four sides, the wall positioned between the surplus-length section EOP of the output port OP and the surplus-length section EODF of the output delivery fiber ODF is called a wall SW. As shown in FIG. 8, the wall SW is disposed between the output port OP and the output delivery fiber ODF so that the surplus-length section EODF, which is a part of the output delivery fiber ODF, and the surplus-length section EOP, which is a part of the output port OP, are shielded from each other.

The wall SW has a portion (in Embodiment 3, a portion of a long side of the rectangular wall SW which long side is in contact with the base section B) including a cutout through which the output delivery fiber ODF can pass. In addition, among the four walls, the wall facing the wall SW has a portion including a cutout similar to that in the wall SW. In FIG. 7, this cutout is not illustrated.

<Configuration of Optical Fiber Fuse Protection Device 30M>

Similarly to the optical fiber fuse protection device 10M, an optical fiber fuse protection device 30M is configured such that a surplus-length section EOP and a surplus-length section EODF are arranged so that an area in which the surplus-length section EOP is disposed and an area in which the surplus-length section EODF overlap each other, when a base section B is viewed in a direction normal to the base section B. For this purpose, the optical fiber fuse protection device 30M includes an output port OP, an output delivery fiber ODF, a shell SH1 that covers the surplus-length section EOP of the output port OP, and a shell SH2 that covers the surplus-length section EODF of the output delivery fiber ODF.

The shell SH1 is identical to the shell SH shown in FIG. 8, except that the shell SH1 accommodates the surplus-length section EOP, not the surplus-length section EODF. In addition, the surplus-length section EODF is disposed on a ceiling wall TW1 of the shell SH1.

The shell SH2 is configured in a similar manner to the shell SH shown in FIG. 8, and is fixed on the ceiling wall TW1 so as to cover the surplus-length section EODF.

Thus, as shown in FIG. 9, the ceiling wall TW1 is disposed between the output port OP and the output delivery fiber ODF so that the surplus-length section EODF, which is a part of the output delivery fiber ODF, and the surplus-length section EOP, which is a part of the output port OP, are shielded from each other. A part of the ceiling wall TW1 has an opening through which the output port OP or the output delivery fiber ODF can extend from the lower side of the ceiling wall TW1 to the upper side of the ceiling wall TW1. In the insert in FIG. 1, this opening is not illustrated. The upper side of the surplus-length section EODF is covered with a ceiling wall TW2 of the shell SH2, and the lateral sides of the surplus-length section EODF are covered with four walls surrounding the ceiling wall TW2 of the shell SH2 from four sides.

Embodiment 4

Figure 10:
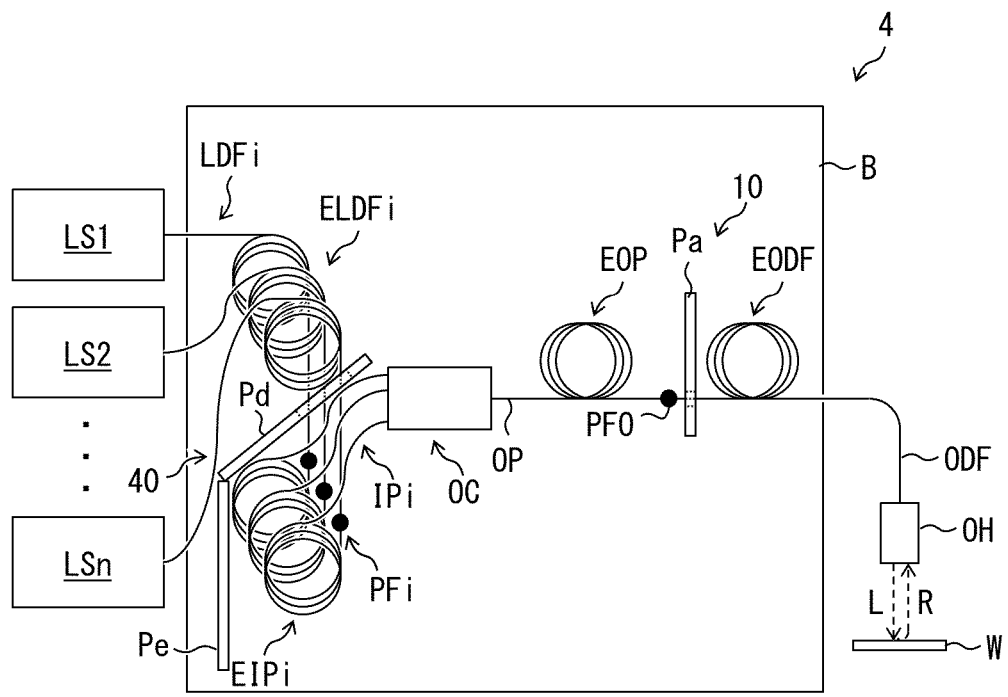
FIG. 10 is a block diagram of a laser device including an optical fiber fuse protection device in accordance with Embodiment 4 of the present invention.

With reference to FIG. 10, a laser device 4 including an optical fiber fuse protection device 40 in accordance with Embodiment 4 of the present invention will be described. The laser device 4 can be achieved by adding a partition wall Pd and a partition wall Pe to the laser device 1 (see FIG. 1) in accordance with Embodiment 1. Therefore, members having functions identical to those of the respective members described with Embodiment 1 are given respective identical reference numerals, and a description of those members is omitted here.

The optical fiber fuse protection device 10 provided to the laser device 1 includes the output port OP as the upstream optical fiber, the output delivery fiber ODF as the downstream optical fiber, and the partition wall Pa as the wall. That is, the optical fiber fuse protection device 10 can be expressed as being obtained by applying, to the stage downstream of the output combiner OC, the method in accordance with one or more embodiments of the present invention for reducing the influence of the optical fiber fuse, on the basis of an assumption that a position where optical fiber fuse can occur is any position of the output delivery fiber ODF.

As shown in FIG. 10, the laser device 4 includes, in addition to the optical fiber fuse protection device 10 disposed at the stage downstream of the output combiner OC, the optical fiber fuse protection device 40 disposed at a stage upstream of the output combiner OC. The optical fiber fuse protection device 40 includes laser delivery fibers LDFi as the upstream optical fiber, input ports IPi as the downstream optical fiber, and the partition walls Pd and Pe as the wall. That is, the optical fiber fuse protection device 40 can be expressed as being obtained by applying, to the stage downstream of laser light sources LSi, the method in accordance with one or more embodiments of the present invention for reducing the influence of the optical fiber fuse, on the basis of an assumption that a position where optical fiber fuse can occur is any position of the input ports IPi.

The partition wall Pd has a similar configuration to that of the partition wall Pa, although the partition wall Pd is disposed at a location different from that of the partition wall Pa. The partition wall Pd is one of multiple embodiments of the wall interposed between the input ports IP1 to IPn and the laser delivery fibers LDF1 to LDFn, and is preferably made of a flame retardant material. In Embodiment 4, the partition wall Pd is made of a metal (e.g., copper or aluminum), which is one example of the flame retardant material.

With the optical fiber fuse protection device 40 configured to include the partition wall Pd, in a case where optical fiber fuse occurs in any of the input ports IP1 to IPn, it is possible to reduce the influence (e.g., leaping fire) that the laser delivery fibers LDFi can receive from the input port IPi in which the optical fiber fuse has occurred and which has been heated to an excessively high temperature.

The partition wall Pe has a similar configuration to those of the partition walls Pa and Pd, although the partition wall Pe is disposed at a location different from those of the partition walls Pa and Pd. The partition wall Pe is one of multiple embodiments of the wall interposed between the input ports IP1 to IPn and the laser light sources LS1 to LSn (more specifically, the laser delivery fibers LDF1 to LDFn), and is preferably made of a flame retardant material. In Embodiment 4, the partition wall Pe is made of a metal (e.g., copper or aluminum), which is one example of the flame retardant material. As is the case of the optical fiber fuse protection device 10, the optical fiber fuse protection device 40 is not particularly limited in terms of the arrangement of the laser light sources LSi. In the optical fiber fuse protection device 40, the partition wall Pe may be omitted, in a case where, among an area surrounding the input ports IPi, an area not shielded by the partition wall Pd does not include any element to be protected from optical fiber fuse, such as the laser delivery fibers LDFi and the laser light sources LSi.

With the optical fiber fuse protection device 40 provided with the partition wall Pe, in a case where optical fiber fuse occurs in any of the input ports IP1 to IPn, it is possible to protect the laser light sources LSi from leaping fire caused by the optical fiber fuse.

The optical fiber fuse protection device 40 may include at least the partition wall Pd, and may not include the partition wall Pe.

As a configuration for carrying out the method in accordance with one or more embodiments of the present invention for reducing the influence of optical fiber fuse, the optical fiber fuse protection device 40 employs a configuration similar to the partition wall Pa shown in FIGS. 1 and 2 (i.e., the configuration of the optical fiber fuse protection device 10). However, the configuration that the optical fiber fuse protection device 40 employs to carry out the method in accordance with one or more embodiments of the present invention for reducing the influence of optical fiber fuse is not limited to the configuration of the optical fiber fuse protection device 10, but can alternatively employ any of the configurations of the optical fiber fuse protection devices 10M, 20, 20M, 30, and 30M.

Embodiment 5

Figure 11:
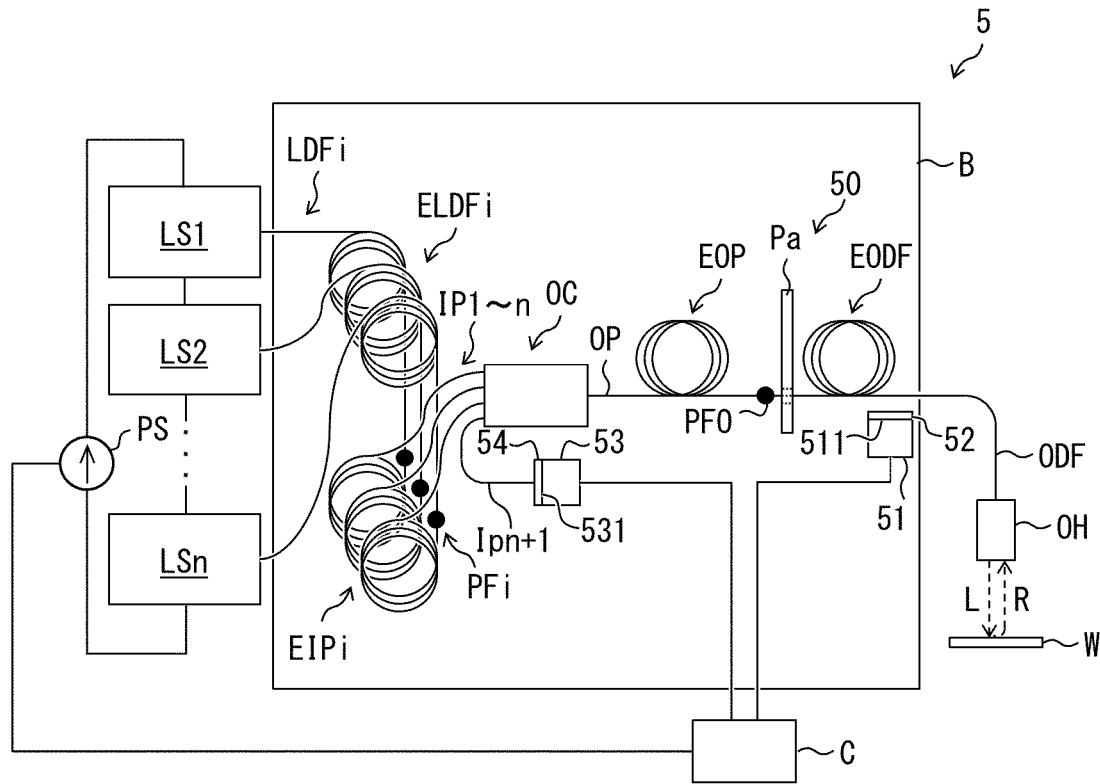
FIG. 11 is a block diagram of a laser device including an optical fiber fuse protection device in accordance with Embodiment 5 of the present invention.

With reference to FIG. 11, a laser device 5 including an optical fiber fuse protection device 50 in accordance with Embodiment 5 of the present invention will be described.

FIG. 11 is a block diagram of the laser device 5. The laser device 5 can be achieved by replacing, in the laser device 1 shown in FIG. 1, the optical fiber fuse protection device 10 with the optical fiber fuse protection device 50. A power source PS shown in FIG. 11 is configured to supply a driving current to laser light sources LS1 to LSn, and an output of the power source PS is controlled by a control section C (described later).

The optical fiber fuse protection device 50 can be achieved by modifying the optical fiber fuse protection device 10 such that (1) the number of input ports IPi of an output combiner OC is changed from n to n+1 (here, n is the total number of laser light sources LSi), (2) a first photodiode 51 and a first filter 52 are additionally provided, and (3) a second photodiode 53 and a second filter 54 are additionally provided. The laser device 5 includes, in addition to the optical fiber fuse protection device 50, the power source PS and the control section C, each of which will be described later. Therefore, members having functions identical to those of the respective members described with Embodiment 1 are given respective identical reference numerals, and a description of those members is omitted here. Thus, also in Embodiment 5, the wavelength of laser light oscillated by each laser light source LSi is 1070 nm.

As described above, the output combiner OC included in the optical fiber fuse protection device 50 includes the input ports IPi greater in total number than the laser light sources LSi. Thus, the input port IPn+1 of the output combiner OC is an input port to which no laser light source LSi is connected.

The photodiode 51 has a light-receiving surface 511, and outputs a first output value, which is an output value corresponding to the intensity of light incident on the light-receiving surface 511. The photodiode 51 is one of multiple embodiments of the first photodetector recited in the claims, and the light-receiving surface 511 is one of multiple embodiments of the first light-receiving surface recited in the claims. Similarly, the photodiode 53 has a light-receiving surface 531, and outputs a second output value, which is an output value corresponding to the intensity of light incident on the light-receiving surface 531. The photodiode 53 is one of multiple embodiments of the second photodetector recited in the claims, and the light-receiving surface 531 is one of multiple embodiments of the second light-receiving surface recited in the claims.

It is known that light generated as a result of optical fiber fuse has a peak wavelength that is included mainly in a visible range (among this, a wavelength band of not less than 400 nm and not more than 700 nm). The peak wavelength is not limited to any particular one. Meanwhile, as described above, in Embodiment 5, the wavelength of the laser light oscillated by each laser light source LSi is 1070 nm. Thus, it is preferable that each of the photodiodes 51 and 53 be configured to detect light within a second wavelength band in preference to light within a first wavelength band, where the first wavelength band is a certain band included in a certain wavelength (e.g., not less than 1000 nm and less than 1100 nm) including the wavelength (in Embodiment 5, 1070 nm) of the laser light and the second wavelength band is a certain wavelength band included in the visible light range. In other words, it is preferable that each of the photodiodes 51 and 53 be configured to detect light within a certain wavelength band included in the visible light range in preference to light having the wavelength of the laser light. One example of the first wavelength band is a wavelength band of not less (i.e., greater than or equal to) than 1000 nm and less than 1100. One example of the second wavelength band is a wavelength band of not less (i.e., greater than or equal to) than 400 nm and not more than 700 nm. The bandwidths of the first wavelength band and the second wavelength band are not limited to any particular ones, and can be set as appropriate.

In order to make it possible for the photodiodes 51 and 53 to detect light within the second wavelength band in preference to light within the first wavelength band, (1) photodiodes 51 and 53 each configured to have a higher light-receiving sensitivity (unit: A/W) with respect to light within the second wavelength band than that with respect to light within the first wavelength band may be adopted or (2) filters 52 and 54 each configured to have a higher transmittance with respect to light within the second wavelength band than that with respect to light within the first wavelength band may be adopted. Both the photodiodes 51 and 53 described as (1) and the filters 52 and 54 described as (2) may be adopted. With the configuration in which the photodiodes 51 and 53 are configured to detect light within the second wavelength band in preference to light within the first wavelength band, the photodiodes 51 and 53 can detect light generated as a result of optical fiber fuse in preference to the laser light. Consequently, it is possible to reduce the possibility that another light that is not caused by optical fiber fuse may be detected.

In the optical fibers (e.g., the output delivery fiber ODF and the output port OP) constituting the laser device 5, stimulated Raman scattering may be caused by laser light that is propagating, and consequently Stokes light may be generated. A certain wavelength band including the Stokes light is called a third wavelength band. In a case where the wavelength of the laser light is 1070 nm as in Embodiment 5, one example of the third wavelength band is a wavelength band of not less than 1100 nm and less than 1200 nm. The bandwidth of the third wavelength band is not limited to any particular one, and can be set as appropriate.

In a case where the above-described Stokes light can be generated, it is preferable that the photodiodes 51 and 53 be configured to detect light within the second wavelength band in preference to light within the first wavelength band and light within the third wavelength band. For this purpose, (3) photodiodes 51 and 53 each configured to have a higher light-receiving sensitivity (unit: A/W) with respect to light within the second wavelength band than those with respect to light within the first wavelength band and light within the third wavelength band may be adopted or (4) filters 52 and 54 each configured to have a higher transmittance with respect to light within the second wavelength band than those with respect to light within the first wavelength band and light within the third wavelength band may be adopted. Both the photodiodes 51 and 53 described as (3) and the filters 52 and 54 described as (4) may be adopted. With the configuration in which the photodiodes 51 and 53 are configured to detect light within the second wavelength band in preference to light within the first wavelength band and light within the third wavelength band, the photodiodes 51 and 53 can detect light generated as a result of optical fiber fuse in preference to the Stokes light. Consequently, it is possible to further reduce the possibility that another light that is not caused by optical fiber fuse may be detected.

The photodiode 51 is disposed such that the light-receiving surface 511 faces a side surface of any section of the output delivery fiber ODF. Between the light-receiving surface 511 and the side surface of the output delivery fiber ODF, the first filter 52 is interposed.

The photodiode 53 is disposed such that the light-receiving surface 531 is coupled to the input port IPn+1 of the output combiner OC. Between the light-receiving surface 531 and the input port IPn+1, the second filter 54 is interposed. The photodiode 53 is identical in configuration to the photodiode 51, and the second filter 54 is identical in configuration to the first filter 52.

The control section C refers to the first output value supplied from the photodiode 51 and the second output value supplied from the photodiode 53. Then, if at least one of the first output value and the second output value exceeds a certain threshold, the control section C controls the laser light sources LSi so that beams of laser light to be output are reduced or become zero.

Embodiment 5 has been discussed under an assumption that the optical fiber fuse protection device 50 includes the photodiodes 51 and 53. Alternatively, in one or more embodiments of the present invention, the optical fiber fuse protection device 50 may include at least one of the photodiodes 51 and 53. In this case, the control section C may refer to an output value from at least one of the photodiodes 51 and 53 to control the laser light sources LSi.

<Control Section C>

The foregoing functions of the control section C included in the optical fiber fuse protection device 50 can be realized by a logic circuit (hardware) provided in an integrated circuit (IC chip) or the like or can alternatively be realized by software. In the latter case, the laser device 5 includes a computer that executes instructions of a program that is software realizing the foregoing functions of the control section C. The computer, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that the above functionality can also be achieved in the form of a computer data signal in which the program is embodied via electronic transmission and which is embedded in a carrier wave.

Embodiment 6

Embodiments 1 to 5 have been discussed under an assumption that the laser devices 1 to 5 each include n laser light sources LS1 to LSn. Alternatively, a laser device to which the optical fiber fuse protection device in accordance with one or more embodiments of the present invention is applied may be a laser device including a single laser light source LS1.

For example, in a case where a laser device 1 includes only a laser light source LS1, an output combiner OC may be omitted and an exit end of a laser delivery fiber LDF1 of a laser light source LS1 and an entrance end of an output delivery fiber ODF of an output head OH may be fusion-spliced to each other. In this case, an optical fiber fuse protection device in accordance with Embodiment 6 can be achieved on the basis of the optical fiber fuse protection device 10. That is, Embodiment 6 may be read as Embodiment 1 employing the laser delivery fiber LDF1 as one of multiple embodiments of the upstream optical fiber and the output delivery fiber ODF as one of multiple embodiments of the downstream optical fiber.

Examples of the present invention can also be expressed as follows:

An optical fiber fuse protection device in accordance with a first example includes: an upstream optical fiber disposed on an upstream side; a downstream optical fiber disposed on a downstream side, the downstream optical fiber being fusion-spliced to the upstream optical fiber and being made of a single optical fiber or a plurality of optical fibers fusion-spliced to each other; and a wall interposed between a part of the upstream optical fiber and a part of the downstream optical fiber.

With the above configuration, the wall is interposed between the downstream optical fiber, in which optical fiber fuse is likely to occur, and the upstream optical fiber. Therefore, even in a case where optical fiber fuse occurs in any position of the downstream optical fiber and the downstream optical fiber is heated to an excessively high temperature, the optical fiber fuse protection device in accordance with the first example can reduce the influence (e.g., leaping fire) that the upstream optical fiber can receive from the downstream optical fiber having been heated to an excessively high temperature.

An optical fiber fuse protection device in accordance with a second example of the present invention is configured such that, in the first example, the part of the upstream optical fiber and the part of the downstream optical fiber are shielded from each other by the wall.

With the above configuration, the part of the upstream optical fiber and the part of the downstream optical fiber are shielded from each other by the wall. Therefore, even in a case where optical fiber fuse occurs in any position of the downstream optical fiber and the downstream optical fiber is heated to an excessively high temperature, the optical fiber fuse protection device in accordance with the second example can reliably reduce the influence that the upstream optical fiber can receive from the downstream optical fiber having been heated to an excessively high temperature.

An optical fiber fuse protection device in accordance with a third example of the present invention is configured such that, in the second example, the part of the upstream optical fiber is at least a part of a surplus-length section of the upstream optical fiber, and the part of the downstream optical fiber is at least a part of a surplus-length section of the downstream optical fiber.

With the above configuration, at least the part of the surplus-length section of the upstream optical fiber and at least the part of the surplus-length section of the downstream optical fiber are shielded from each other by the wall. Therefore, even in a case where optical fiber fuse occurs in any position of the downstream optical fiber and the downstream optical fiber is heated to an excessively high temperature, the optical fiber fuse protection device in accordance with the third example can reliably reduce the influence that at least the part of the surplus-length section of the upstream optical fiber can receive from at least the part of the surplus-length section of the downstream optical fiber having been heated to an excessively high temperature.

An optical fiber fuse protection device in accordance with a fourth example of the present invention is configured such that, in any one of the first to third examples, the optical fiber fuse protection device further includes: a first photodetector having a first light-receiving surface and being configured to detect visible light incident on the first light-receiving surface, wherein the first light-receiving surface is disposed so as to face a side surface of any section of the downstream optical fiber, and the first photodetector is further configured to output a first output value corresponding to an intensity of the visible light having been detected.

In a case where optical fiber fuse occurs in the optical fiber, the part where the optical fiber fuse occurs often emits visible light (e.g., pale light). The optical fiber fuse having occurred is likely to propagate toward the upstream side of the optical fiber along the optical fiber while emitting visible light.

With the above configuration, in a case where optical fiber fuse occurs in a position of the downstream optical fiber which position is downstream of the section facing the first light-receiving surface, the first photodetector can detect the visible light having been emitted. Consequently, it is possible to detect generation of the optical fiber fuse that is propagating toward the upstream side. Therefore, in the optical fiber fuse protection device in accordance with the fourth example, it is possible to reduce the risk that the optical fiber fuse having occurred in the downstream optical fiber may excessively propagate toward the upstream side and the influence of the optical fiber fuse may be given not only to the downstream optical fiber but also to the upstream optical fiber.

An optical fiber fuse protection device in accordance with a fifth example of the present invention is configured such that, in the fourth example, the first photodetector is further configured to detect light within a second wavelength band in preference to light within a first wavelength band, where the first wavelength band is a certain wavelength band included in a band of not less (i.e., greater than or equal to) than 1000 nm and less than 1100 nm and the second wavelength band is a wavelength band included in a visible light range.

With the above configuration, it is possible to reliably detect, with the first photodetector, the optical fiber fuse having occurred in the downstream optical fiber.

An optical fiber fuse protection device in accordance with a sixth example of the present invention is configured such that, in any one of the first to fifth examples, the optical fiber fuse protection device further includes: a combiner including a plurality of input ports and an output port optically coupled to the plurality of input ports, wherein the upstream optical fiber constitutes the output port of the combiner.

With the above configuration, even in a case where optical fiber fuse occurs in any position of the downstream optical fiber and the downstream optical fiber is heated to an excessively high temperature, it is possible to reduce the influence that the combiner can receive from the upstream optical fiber having been heated to an excessively high temperature.

An optical fiber fuse protection device in accordance with a seventh example of the present invention is configured such that, in the sixth example, the optical fiber fuse protection device further includes: a second photodetector having a second light-receiving surface and being configured to detect visible light incident on the second light-receiving surface, wherein the second light-receiving surface is coupled to any of the plurality of input ports, and the second photodetector is further configured to output a second output value corresponding to an intensity of the visible light having been detected.

In a case where optical fiber fuse occurs in any of the optical fibers, the part where the optical fiber fuse occurs often emits visible light (e.g., pale light). Also, the optical fiber fuse having occurred is likely to propagate toward the upstream side of the optical fiber along the optical fiber while emitting visible light.

With the above configuration, in a case where optical fiber fuse occurs in any position of the downstream optical fiber, the second photodetector detects the visible light having been emitted. Consequently, it is possible to detect generation of the optical fiber fuse. Therefore, in the optical fiber fuse protection device in accordance with the sixth example, it is possible to reduce the risk that the optical fiber fuse having occurred in the downstream optical fiber may excessively propagate toward the upstream side and the influence of the optical fiber fuse may be given not only to the downstream optical fiber but also to the upstream optical fiber An optical fiber fuse protection device in accordance with an eighth example of the present invention is configured such that, in the seventh example, the second photodetector is further configured to detect light within a second wavelength band in preference to light within a first wavelength band, where the first wavelength band is a certain wavelength band included in a band of not less (i.e., greater than or equal to) than 1000 nm and less than 1100 nm and the second wavelength band is a wavelength band included in a visible light range.

With the above configuration, it is possible to reliably detect, with the second photodetector, the optical fiber fuse having occurred in the downstream optical fiber.

A laser device in accordance with a ninth example of the present invention includes: a laser light source; and the optical fiber fuse protection device recited in any one of the first to eighth examples.

With the above configuration, the laser device in accordance with the ninth example can bring about effects similar to those of the optical fiber fuse protection device in accordance with any one of the first to eighth examples.

A laser device in accordance with a tenth example of the present invention includes: a laser light source; and the optical fiber fuse protection device recited in any one of the first to fourth examples, wherein the laser light source has an output port, and the upstream optical fiber constitutes the output port of the laser light source.

With the above configuration, even in a case where optical fiber fuse occurs in any position of the downstream optical fiber and the downstream optical fiber is heated to an excessively high temperature, it is possible to reduce the influence that the laser light source can receive from the upstream optical fiber having been heated to an excessively high temperature.

A laser device in accordance with an eleventh example of the present invention is configured such that, in the tenth example, the optical fiber fuse protection device is included as a first optical fiber fuse protection device, and the laser device further includes the optical fiber fuse protection device recited in any one of the sixth to eighth examples as a second optical fiber fuse protection device.

With the above configuration, the laser device in accordance with the eleventh example can bring about the effects of the optical fiber fuse protection devices in accordance with the sixth to eighth examples and the effects of the laser device in accordance with the tenth example.

A laser device in accordance with a twelfth example of the present invention includes: a laser light source; the optical fiber fuse protection device in accordance with the fourth example; and a control section configured to refer to the first output value to control, in a case where the first output value exceeds a certain threshold, the laser light source so that an output from the laser light source is reduced.

With the above configuration, the laser device in accordance with the twelfth example can refer to the first output value to determine whether or not visible light is emitted from any position of the downstream optical fiber, i.e., whether or not optical fiber fuse occurs in any position of the downstream optical fiber. Then, if the visible light is emitted, i.e., the optical fiber fuse occurs, the laser device can reduce an output from the laser light source. Therefore, even in a case where optical fiber fuse occurs in any position of the downstream optical fiber and the downstream optical fiber is heated to an excessively high temperature, the laser device in accordance with the twelfth example can reduce the output from the laser light source before the upstream optical fiber is influenced by the upstream optical fiber having been heated to an excessively high temperature, thereby stopping propagation of the optical fiber fuse.

A laser device in accordance with a thirteenth example of the present invention is configured such that, in the laser device in accordance with the twelfth example, the laser light source is configured to oscillate laser light within an infrared range, and the first photodetector is further configured to detect light within a certain wavelength band included in a visible light range in preference to light having a wavelength of the laser light.

With the above configuration, it is possible to reliably detect, with the first photodetector, the optical fiber fuse having occurred in the downstream optical fiber.

A laser device in accordance with a fourteenth example of the present invention includes: a laser light source; the optical fiber fuse protection device in accordance with the seventh example; and a control section configured to refer to the second output value to control, in a case where the second output value exceeds a certain threshold, the laser light source so that an output from the laser light source is reduced.

With the above configuration, the laser device in accordance with the fourteenth example can refer to the second output value to determine whether or not visible light is emitted from any position of the downstream optical fiber, i.e., whether or not optical fiber fuse occurs in any position of the downstream optical fiber. Then, if the visible light is emitted, i.e., the optical fiber fuse occurs, the laser device can reduce an output from the laser light source. Therefore, even in a case where optical fiber fuse occurs in any position of the downstream optical fiber and the downstream optical fiber is heated to an excessively high temperature, the laser device in accordance with the fourteenth example can reduce the output from the laser light source before the upstream optical fiber is influence by the upstream optical fiber having been heated to an excessively high temperature, thereby stopping propagation of the optical fiber fuse.

A laser device in accordance with a fifteenth example of the present invention is configured such that, in the laser device in accordance with the fourteenth example, the laser light source is configured to oscillate laser light within an infrared range, and the second photodetector is further configured to detect light within a certain wavelength band included in a visible light range in preference to light having a wavelength of the laser light.

With the above configuration, it is possible to reliably detect, with the second photodetector, the optical fiber fuse having occurred in the downstream optical fiber.

A method in accordance with a sixteenth example of the present invention is a method for reducing, in a case where optical fiber fuse occurs in any position of a downstream optical fiber of an optical device, an influence of the optical fiber fuse that can be given to an upstream optical fiber of the optical device, the optical device including (a) the upstream optical fiber disposed on an upstream side and (b) the downstream optical fiber disposed on a downstream side, the downstream optical fiber being fusion-spliced to the upstream optical fiber and being made of a single optical fiber or a plurality of optical fibers fusion-spliced to each other, said method including the step of: disposing a wall at a location between a part of the upstream optical fiber and a part of the downstream optical fiber so that the upstream optical fiber and the downstream optical fiber are shielded from each other.

With the above configuration, the method in accordance with the sixteenth example can bring about effects similar to those of the optical fiber fuse protection device in accordance with the first example.

[Supplementary Notes]

The present invention is not limited to the embodiments, but can be altered by a skilled person in the art within the scope of the claims. The present invention also encompasses, in its technical scope, any embodiment derived by combining technical means disclosed in differing embodiments. Accordingly, the scope of the invention should be limited only by the attached claims.

REFERENCE SIGNS LIST 1, 2, 3, 4, 5: Laser device
10, 10M, 20, 20M, 30, 30M, 40, 50: Optical fiber fuse protection device
LS1 to LSn, LSi: Laser light source
LDF1 to LDFn, LDFi: Laser delivery fiber
OC: Output combiner
IP1 to IPn, IPn+1, IPi: Input port
OP: Output port
OH: Output head
ODF: Output delivery fiber
PF1 to PFn, PFO: Fusion-splicing point
Pa, Pb, Pc: Partition wall
WL, SW: Wall
TW1: Ceiling wall

The invention claimed is:

1. An optical fiber fuse protection device included in a laser device, the optical fiber fuse protection device comprising:
an upstream optical fiber including an upstream surplus-length section that is coiled and disposed on a main surface of a base of the laser device;
a downstream optical fiber including a downstream surplus-length section that is coiled and disposed on the main surface so as not to overlap the upstream surplus-length section in a plan view, wherein the downstream optical fiber is fusion-spliced to the upstream optical fiber and is made of a single optical fiber or a plurality of optical fibers fusion-spliced to each other; and
a wall interposed between the upstream surplus-length section and the downstream surplus-length section and that suppresses leaping fire from the upstream surplus-length section to the downstream surplus-length section or from the downstream surplus-length section to the upstream surplus-length section.

2. The optical fiber fuse protection device as set forth in claim 1, wherein
the wall includes a cutout, and
a part of the downstream optical fiber between the upstream surplus-length section and the downstream surplus-length section passes through the cutout.

3. The optical fiber fuse protection device as set forth in claim 1, further comprising:
a photodetector, having a light-receiving surface, that detects visible light incident on the light-receiving surface, wherein
the light-receiving surface faces a side surface of any section of the downstream optical fiber, and
the photodetector outputs an output value corresponding to an intensity of the visible light that is detected.

4. The optical fiber fuse protection device as set forth in claim 3, wherein
the photodetector either:
has a higher light-receiving sensitivity with respect to visible light than with respect to light within a wavelength band that is greater than or equal to 1000 nm and less than 1100 nm, or
comprises a filter through which light is incident on the light-receiving surface and that has a higher transmittance with respect to visible light than with respect to light within the wavelength band.

5. The laser device comprising the optical fiber fuse protection device as set forth in claim 3, the laser device further comprising:
a laser light source; and
a control section that refers to the output value to control, in a case where the output value exceeds a certain threshold, the laser light source so that an output from the laser light source is reduced.

6. The laser device as set forth in claim 5, wherein
the laser light source oscillates laser light within an infrared range, and
the photodetector:
has a higher light-receiving sensitivity with respect to visible light than with respect to light within a wavelength band that is greater than or equal to 1000 nm and less than 1100 nm, or
comprises a filter through which light is incident on the light-receiving surface and that has a higher transmittance with respect to visible light than with respect to light within the wavelength band.

7. The laser device comprising the optical fiber fuse protection device as set forth in claim 1, the laser device further comprising:
a laser light source.

8. The laser device as set forth in claim 7, wherein
the laser light source has an output port, and
the upstream optical fiber constitutes the output port of the laser light source.

9. An optical fiber fuse protection device comprising:
an upstream optical fiber;
a downstream optical, wherein
the downstream optical fiber is fusion-spliced to the upstream optical fiber and is made of a single optical fiber or a plurality of optical fibers fusion-spliced to each other;
a wall interposed between a part of the upstream optical fiber and a part of the downstream optical fiber; and
a combiner including a plurality of input ports and an output port optically coupled to the plurality of input ports, wherein
the upstream optical fiber constitutes the output port of the combiner.

10. The optical fiber fuse protection device as set forth in claim 9, further comprising:
a photodetector, having a light-receiving surface, that detects visible light incident on the light-receiving surface, wherein
the light-receiving surface is coupled to any of the plurality of input ports, and
the photodetector outputs an output value corresponding to an intensity of the visible light that is detected.

11. The optical fiber fuse protection device as set forth in claim 10, wherein
the photodetector:
has a higher light-receiving sensitivity with respect to visible light than with respect to light within a wavelength band that is greater than or equal to 1000 nm and less than 1100 nm, or
comprises a filter through which light is incident on the light-receiving surface and that has a higher transmittance with respect to visible light than with respect to light within the wavelength band.

12. A laser device comprising:
a laser light source;
the optical fiber fuse protection device recited in claim 10; and
a control section that refers to the output value to control, in a case where the output value exceeds a certain threshold, the laser light source so that an output from the laser light source is reduced.

13. The laser device as set forth in claim 12, wherein
the laser light source oscillates laser light within an infrared range, and
the photodetector:
has a higher light-receiving sensitivity with respect to visible light than with respect to light within a wavelength band that is greater than or equal to 1000 nm and less than 1100 nm, or
comprises a filter through which light is incident on the light-receiving surface and that has a higher transmittance with respect to visible light than with respect to light within the wavelength band.

14. A laser device comprising:
a laser light source that has an output port;
a first optical fiber fuse protection device;
a second optical fiber fuse protection device that is the optical fiber fuse protection device as set forth in claim 9, wherein
the first optical fiber fuse protection device comprises:
an upstream optical fiber;
a downstream optical fiber, wherein
the downstream optical fiber of the first optical fiber fuse protection device is fusion-spliced to the upstream optical fiber of the first optical fiber fuse protection device and is made of a single optical fiber or a plurality of optical fibers fusion-spliced to each other; and a wall interposed between a part of the upstream optical fiber of the first optical fiber fuse protection device and a part of the downstream optical fiber of the first optical fiber fuse protection device, and the upstream optical fiber of the first optical fiber fuse protection device constitutes the output port of the laser light source.

15. An optical fiber fuse protection device comprising:

an upstream optical fiber including an upstream surplus-length section that is coiled and disposed in a first layer;

a downstream optical fiber including a downstream surplus-length section that is coiled and disposed in a second layer different from the first layer to overlap the upstream surplus-length section in a plan view, wherein the downstream optical fiber is fusion-spliced to the upstream optical fiber and is made of a single optical fiber or a plurality of optical fibers fusion-spliced to each other; and a wall interposed between the upstream surplus-length section and the downstream surplus-length section and that suppresses leaping fire from the upstream surplus-length section to the downstream surplus-length section or from the downstream surplus-length section to the upstream surplus-length section.

* * * * *